US012770100B2

(12) United States Patent
Treminio et al.

(10) Patent No.: US 12,770,100 B2
(45) Date of Patent: Oct. 20, 2026

(54) ASSET MANAGEMENT TECHNIQUES

(71) Applicant: Universal City Studios LLC, Universal City, CA (US)

(72) Inventors: Geovanny Treminio, Orlando, FL (US); Thomas M. Panzella, Orlando, FL (US); Nathan Roberts, Orlando, FL (US); Gregory Paul Habiak, Orlando, FL (US); David Gerard Majdali, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 18/902,294

(22) Filed: Sep. 30, 2024

(65) Prior Publication Data

US 2026/0094112 A1 Apr. 2, 2026

(51) Int. Cl.
*G06Q 10/087* (2023.01)

(52) U.S. Cl.
CPC .................................. *G06Q 10/087* (2013.01)

(58) Field of Classification Search
CPC .................................................... G06Q 10/087
See application file for complete search history.

(56) References Cited

U.S. PATENT DOCUMENTS 8,200,737 B2 6/2012 Tarabzouni et al.
9,064,219 B2 6/2015 Hall et al.
9,087,338 B2 7/2015 Levine et al.
9,230,453 B2 * 1/2016 Van Sickle ............ G01C 11/02
2014/0280199 A1 9/2014 Bare et al.
2015/0302253 A1 10/2015 Stewart
2017/0132568 A1 * 5/2017 Glunz ..................... H04L 67/10
2018/0005178 A1 * 1/2018 Göllü ................... G06K 7/1413
2019/0138667 A1 5/2019 Benesh et al.
2020/0285374 A1 9/2020 Collins
2022/0012270 A1 * 1/2022 Worster .................. G06F 16/29
2023/0004691 A1 * 1/2023 Glunz ................ G06Q 30/0635
2024/0004361 A1 * 1/2024 Morris ................... G05B 15/02

FOREIGN PATENT DOCUMENTS

EP 1571515 A1 9/2005
WO 2023023042 A1 2/2023

OTHER PUBLICATIONS

Scada, "Elecdes Design Suite", 2021, https://help.elecdes.com/paneldes/reference/plant-raceway-and-panel-ducting/cable-filling-factor-for-raceway--cables-and-wires 20220012270 (Year: 2021).*

(Continued)

*Primary Examiner* — Allen C Chein
(74) *Attorney, Agent, or Firm* — Fletcher Yoder P.C.

(57) ABSTRACT

An asset management system includes a sensor that detects asset tags to acquire asset geolocation codes of a plurality of assets in a geographic area. The asset management system also includes a controller communicatively coupled to an image sensor that receives the asset geolocation codes of the plurality of assets, receives the image data, generates a model of the geographic area using locations associated with the asset geolocation codes and the image data to place the plurality of assets in the model, and determines a geographic distance between a first asset and a second asset of the plurality of assets using the model.

32 Claims, 5 Drawing Sheets

(56) References Cited

OTHER PUBLICATIONS

Dronedeploy, "Elevate Your Build", 2020, https://connexicore.com/wp-content/uploads/2020/11/Construction_Drone_Data_Playbook.pdf (Year: 2022).*
PCT/US2025/047998 Invite to Pay Additional Fees mailed Jan. 5, 2026.
PCT/US2025/047998 International Search Report and Written Opinion mailed Feb. 26, 2026.

* cited by examiner

ASSET MANAGEMENT TECHNIQUES

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Developing a new facility (e.g., an amusement park, an area expanded from an existing amusement park) may be challenging. For example, the new facility may include various assets, such as construction equipment, hardware (e.g., various systems, equipment, and devices associated with entertainment, support, and utility), and software related to the construction sites and hardware. Development of the new facility may include multiple phases, such as facility design, planning, construction, installation, testing, and operation. Each of these phases may include collaborations from multiple entities. Each entity may generate a considerable amount of asset data in various data formats during the development of the new facility. The asset data may be continuously updated and stored in different locations with different access policies associated with different entities and/or users, resulting in a data complexity in data management, sharing, security, and storage.

Such data complexity (e.g., data formats, locations, accessibilities, security) may create certain challenges for the users from different entities to access, update, and share the asset data in an efficient and secured way. For example, the users may spend considerable time on various tasks associated with asset identifications, asset tracking, asset-related work efficiency, asset-related data management, and so on. In some cases, a lack of a centralized asset management (e.g., using a centralized platform and/or a centralized database) may create additional challenges for the users working on asset management tasks.

In some cases, certain entities may work on the same or similar assets, and these entities may generate redundant data related to a particular asset. In some cases, certain tasks associated with one or more assets may have been developed and/or used previously in one or more developed facilities having the same or similar assets as the new facility. However, the lack of a centralized asset management may result in a lack of efficient and/or secured data sharing with respect to ongoing knowledge (e.g., from the other entity) and/or previous knowledge (e.g., historical data associated with the developed facility). The lack of efficient and/or secured data sharing may inhibit efficient asset management, resulting in duplicated work with increased cost and decreased work efficiency. As such, techniques to securely and efficiently identify, track, and manage various assets associated with a facility development may be desirable.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, an asset management system is provided. The asset management system includes a sensor, an unmanned aerial vehicle (UAV), and a controller. The sensor may detect asset tags to acquire asset geolocation codes of a plurality of assets in a geographic area. The UAV may acquire image data of the geographic area. The controller is communicatively coupled to an image sensor, wherein the controller may receive the asset geolocation codes of the plurality of assets, receive the image data, generate a model of the geographic area using locations associated with the asset geolocation codes and the image data to place the plurality of assets in the model, determine a geographic distance between a first asset and a second asset of the plurality of assets using the model, and generate a cable takeoff comprising an estimated electrical cable length to couple the first asset and the second asset.

In an embodiment, an asset management method is provided. The method includes receiving, via processing circuitry, location data associated with a plurality of assets of a geographic area, wherein the location data is received from a plurality of sources. The method also includes determining, via the processing circuitry, that an individual asset of the plurality of assets is associated with a plurality of different locations based on the location data. The method further includes generating, via the processing circuitry, a model of the geographic area using the location data to place the plurality of assets in the model and wherein the individual asset is placed in the model at the plurality of different locations. The method also includes determining a plurality of geographic distances between the individual asset and a second asset of the plurality of assets using the plurality of different locations of the model. The method further includes generating cable takeoff for each of the plurality of geographic distances, each cable takeoff comprising an estimated electrical cable length to couple the individual asset and the second asset.

In an embodiment, a non-transitory computer readable medium comprising computer-executable instructions that, when executed by at least one processor, may cause the at least one processor to perform operations including detecting one or more asset tags based on sensor data to acquire geolocation codes of a plurality of assets in a geographic area. The operations may also include instructing one or more cameras to acquire image data of the geographic area. The operations may further include receiving the asset geolocation codes of the plurality of assets, receiving the image data, and generating a model of the geographic area using locations associated with the asset geolocation codes and the image data to place the plurality of assets in the model. The operations may also include determining a geographic distance between a first asset and a second asset of the plurality of assets using the model, and generating a cable takeoff comprising an estimated electrical cable length to couple the first asset and the second asset.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
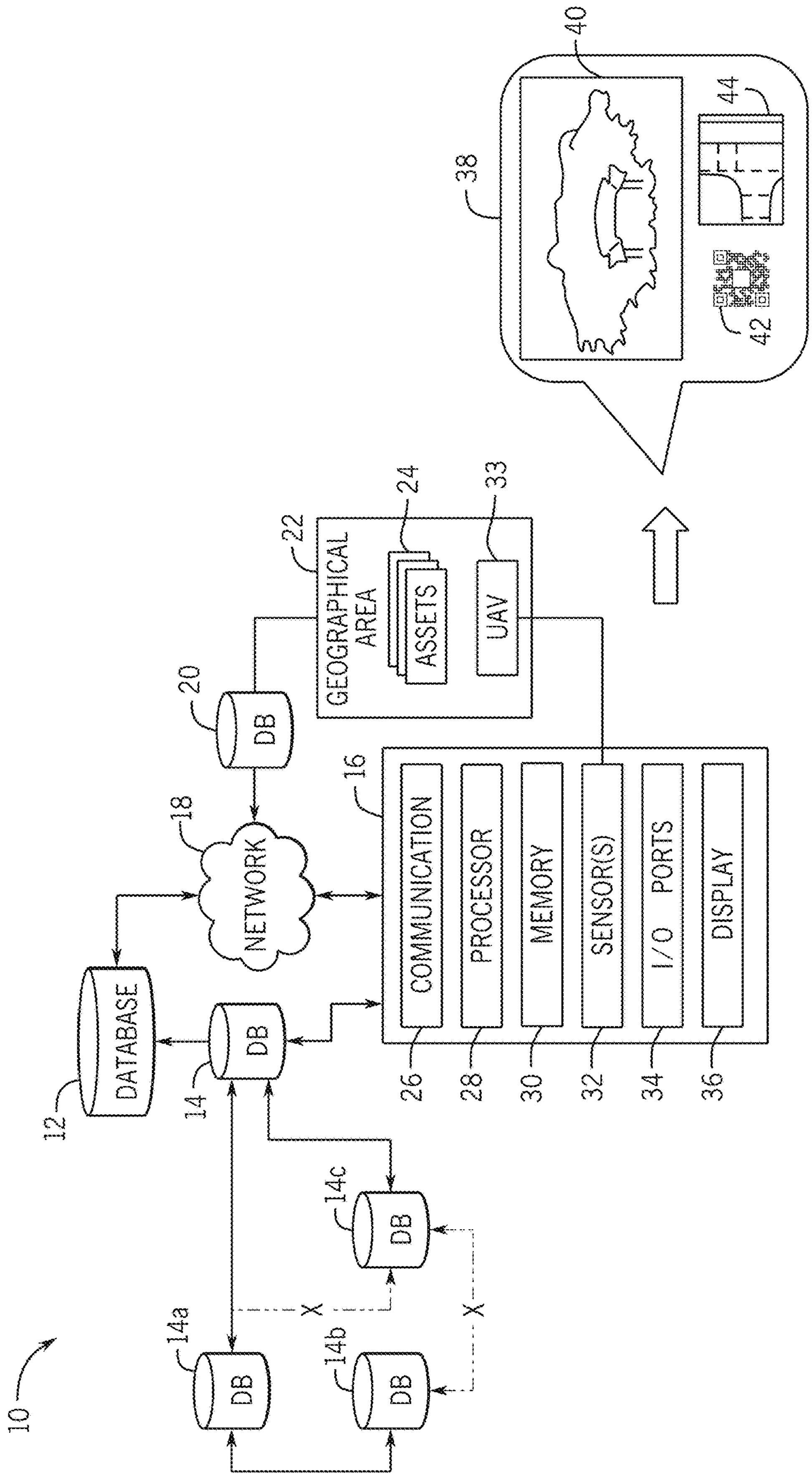
FIG. 1 is a schematic diagram of an asset management system, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The term "cable takeoff" or "cable takeoff measurement" may refer to a measurement (e.g. length) associated for a type of conduits (e.g., cables, wires, pipes). A cable takeoff may include identifying and quantifying the components needed for a construction project to create an accurate list of materials needed for the project. In certain cases, the cable takeoff may include an estimate of remaining capacity for a particular conduit or route, for example, if a conduit has excess capacity to receive more cables.

Theme parks or amusement parks may include attractions or entertainment venues, such as rollercoaster rides, pendulum rides, Ferris wheel rides, dark rides, bumper cars, water rides, and so on. The entertainment venues provide various experiences (e.g., riding experiences, immersive experiences) and scenes (e.g., visual shows including live action, animated figures, computer-generated imagery) for different visitors (e.g., adults, teenagers, children), along with shops, restaurants and other entertainment outlets. Theme parks and other such entertainment venues are becoming increasingly popular.

In order to provide new experiences for the visitors, development of new facilities that include various entertainment venues have become increasingly complex, involving integration of various physical assets, such as construction sites, hardware and software associated with entertainment, support, and utilities. Accordingly, developing a new facility may include multiple phases, such as asset design, planning, constructions, installations, testing, and operations. The development may include complicated collaborations from different entities (e.g., vendors, third parties) associated with same or different phases and/or assets. For example, some entities may generate a large amount of asset data (e.g., drawings, models, worksheets, logs, images) in different data formats (e.g., graphs, CAD models, modeling/simulation models, texts, images, videos) during a course of the development of the new facility. Some entities may continuously update the asset data, which may be stored in different locations (e.g., databases) with different access policies (e.g., authorizations, access levels) associated with different entities and/or users.

New facility development may create a complexity in facility asset management with respect to asset tracking, knowledge and/or data sharing, security, storage, and so on. In some cases, certain gaps may exist between one entity (e.g., a utility provider or commissioner) and another entity (e.g., a vendor, a third party). In some cases, duplicated work may be performed by different entities due to a lack of asset data sharing capabilities. In some cases, a lack of a centralized system (e.g., a system for asset tracking and asset data sharing) in place for basic takeoff quantifications, such as quantifications related to architecture, engineering, and construction during an initial planning process based on appropriate asset data management may cause inefficiencies during the facility development.

The present disclosure relates to systems and methods for providing an asset management system to facilitate various asset planning, modeling, monitoring, tracking, analyzing, estimating, predicting, testing, and operating. Individual assets may be tracked using machine-readable indicia (e.g., barcode, Quick Response (QR) code, and so forth) that may enable cameras or other scanning devices to detect assets by reading a code or other tag. In this manner, the techniques described in the present disclosure may facilitate coordinating virtual representations of amusement park assets, which, at least in some instances, may facilitate design and troubleshooting of amusement park attractions or experiences. In an embodiment, the system may generate scannable geolocation codes (e.g., smart scannable geolocation codes, asset geolocation codes, asset tags) as the machine-readable indicators to track a variety of aspects of the assets, such as asset locations, asset development status, asset data (e.g., data locations, data formats, data accessibilities) within a geographic area. For example, the smart scannable geolocation code may be embedded with unique identification (ID) information (e.g., geographical location, asset-related data) with respect to an asset. Furthermore, image data of the geographical area may be acquired using camera-based devices (e.g., electronic devices, unmanned aerial vehicles). Accordingly, the asset management system may utilize the geolocation codes (e.g., asset geolocation code) and image data within the model to determine information that may be necessary during a new facility development. For example, a combination of the asset geolocation code and image data may be used to provide improved pre-bid cable takeoffs, cable length (e.g., electrical cables) estimation, and/or lengths and locations of gas pipes. As such, the geolocation data of the asset or the geographical area may be visualized (e.g., by users, vendors, third parties, and/or smart devices) based on the model via a 3D modeling application to facilitate construction-related processes. Accordingly, the asset management system streamlines data management by centralizing data associated with a plurality of assets.

Based on the asset information, such as information acquired from the smart scannable geolocation codes, the asset management system (e.g., a centralized asset tracking and asset data sharing) may enable various asset-related operations associated with a development of a new facility (e.g., a new amusement park, a new area expanded from an existing amusement park), which may include different assets, such as construction sites, entertainment systems, equipment, and devices, support systems (e.g., computing systems, databases), utility, software related to the above mentioned construction sites and hardware. For example, the asset management system may provide a precise quantification of assets during different phases of a project (e.g., pre-construction, during construction, post construction). The asset management system may determine that one or more locations associated with one or more asset geolocations codes is incorrect based on image data. Additionally, or alternatively, the asset management system may eliminate assets associated with one or more geolocation codes from a model. In this way, the asset management system provides precise quantification of assets.

In an embodiment, the asset management system may be used to plan construction and/or locations of new assets within a geographical area using stored data associated with existing assets. The asset management system can track locations of conduits (e.g., electrical cables, wires) within the geographical area. For example, stored data associated with the existing assets may be used to determine remaining capacity (e.g., electrical capacity) of one or more conduits. In this way, the asset management system may determine locations for the construction of the new assets based on the amount of remaining capacity. As such, the asset management system can track conduit pathways that may be utilized to provide conduit access to the new assets. In this way, the asset management system may enable planning construction plans and facilitate placements of the new assets.

In another example, the asset management system may reduce or eliminate duplication possibility of assets and asset-related elements. For instance, data retrieved from multiple third-party databases (e.g., a vendor, such as water suppliers, electricity providers, construction companies, gas companies) can be used to facilitate coordination, construction, gas pipes, cable schedules, and cable distance estimation (e.g., estimate a length of electrical cable). Accordingly, a combination of the unique IDs and access to third-party data eliminates or reduces duplicated and/or missing assets. As such, the smart scannable geolocation codes may be scanned by any electronic device equipped with one or more cameras to identify assets and determine geolocation information associated with the specific assets.

In an embodiment, the asset management system may facilitate interactions between one or more third parties by normalizing or standardizing data management associated with one or more assets. For example, the asset management system may provide standardized templates for data reporting, data formatting, and data regularization. As such, a third party may interpret data in real-time without delays or difficulties and thus can be interpreted by all third parties associated with a project. Similarly, centralization of data may allow users to view, add, edit, or delete data associated with one or more assets in real-time. In this way, the asset management system streamlines data management associated with the assets.

Due to the centralization of data associated with assets, the asset management system allows one or more third parties to access data associated with assets seamlessly. For example, a third party, vendor, or user may be able to cross-reference past projects that may be related to the development of new assets. The third party, vendor, or user may be able to filter data in the asset management system based on predefined parameters, such as a level of complexity, type of roller coaster (e.g., a dark ride or outdoor roller coaster), magnetic propulsion, friction wheel drives, amount of axis, etc. As such, the centralization of data allows the asset management system to output data that indicates a completion progress of an asset (e.g., roller coaster is 95% complete during a specific phase of a project) that is viewable by one or more third party, vendor, or user, thereby streamlining construction and development phases of a project.

With the preceding in mind, FIG. 1 is a block diagram of an asset management system 10, in accordance with an embodiment of the present disclosure. The asset management system 10 is communicatively coupled to a variety of data sources that may be used by the asset management system 10 to generate asset data 38. Accordingly, the asset management system 10 may be communicatively coupled to various components including a database 12, third-party database 14, a control system 16, a network 18, and a publicly available database 20.

In certain embodiments, the asset management system 10 may be communicatively coupled to the network 18, which may include collections of computing systems, the Internet, an Intranet system, or the like. The network 18 may facilitate communication between the control system 16, the publicly available database 20, the database 12, and other various data sources. For instance, the network 18 may be communicatively coupled to one or more databases (e.g., the database 12, the publicly available database 20, the third-party database 14) which may store data (e.g., historical data, third-party data, publicly available data) with respect to prior construction projects, prior assets, ongoing construction projects, current asset(s) 24, etc. Accordingly, such data from the one or more databases may be used as inputs into the control system 16 of the asset management system 10 to generate the asset data 38 (e.g., a model 40, a QR code 42, a cable takeoff measurement 44). Furthermore, it should be appreciated that the database 12 may be communicatively coupled to the control system 16 via the network 18 or may be directly (e.g., via wired connection) coupled to the control system 16.

To generate asset data, the asset management system 10 may access third-party data from the third-party database 14. In general, the third-party database 14 includes data from multiple third parties (e.g., primary third party **14*a* (e.g., primary third-party database 14*a*), secondary third party 14*b* (e.g., secondary third-party database 14*b*), tertiary third party 14*c* (e.g., tertiary third-party database 14*c*), or collectively the third-party database 14). Given multiple third parties are utilized during the construction of a new facility, it is expected that each third party will generate its own data, which may be stored in a format unique to a specific third party, as depicted in FIG. 1 As such, this may lead to an inefficient work flow, wherein a specific third party may not be able to access and/or interpret data generated by another third party due to a lack of access, inconsistencies or incompatibilities in data format, or redundant data. For example, the third party 14*a* may generate data and store it in a format that may not be feasible for the third party 14*b* to utilize, thereby causing inefficiencies. In another example, the third party 14*a* may generate data regarding an asset(s) 24 such as a cable takeoff measurement 44, and the third party 14*b* may also generate similar data such as a cable takeoff measurement 44 regarding the asset(s) 24. Having two or more third parties generate similar data may lead to redundancies. As such, FIG. 1 depicts lack of, or inefficient data communication between third parties (e.g., the third party 14***b* cannot access data generated by the third party 14*c*, the third party 14*a* cannot access data generated by the third party 14*c* (represented by the X in FIG. 1)). Accordingly, the asset management system 10 centralizes all data and implements a standardization to data formats associated with an asset(s) 24 from multiple third parties 14*a-c*, thereby allowing the asset management system 10 and/or any component coupled to the asset management system 10 to access the data seamlessly.

In some embodiments, the asset management system 10 may utilize publicly available data from the publicly available database 20. For example, the asset management system 10 may access the publicly available database 20 to access information related to electrical lines, water sources, or other utilities that may be related to the construction of asset(s) 24 within a specific geographical area 22. As such, the asset management system 10 may access and utilize information relevant to asset(s) 24 from the publicly available database 20 to generate asset data 38.

The control system 16 may be any suitable computing system (e.g., cloud computing system) and/or may include any suitable computer device, such as a general-purpose personal computer, a laptop computer, a tablet computer, or a mobile computer that is configured in accordance with present embodiments. The control system 16 may include various types of components that may assist the asset management system 10 in performing various types of tasks and operations described herein. The control system 16 may include a communication component 26, a processor 28, a memory 30, one or more sensor(s) 32, input/output (I/O) port 34, and a display 36.

The control system 16 may be communicatively coupled to the one or more sensor(s) 32 such that the processor 28 receives sensor data from the one or more sensor(s) 32 (e.g., image sensors, cameras, location sensors) to generate the asset data 38. In some embodiments, the communication component 26 may facilitate wired or wireless communication between various components of the control system 16 as well as with external devices, the third-party database 14 or the publicly available database 20. For example, a third party may update information associated with a previously acquired cable takeoff measurement 44 for the asset(s) 24 that may be received by the control system 16. The updated cable takeoff measurement may be communicated to the control system 16 via the communication component 26.

The processor 28 may be any suitable type of computer processor or microprocessor capable of executing computer-executable code. Moreover, the processor 28 may include multiple microprocessors, one or more "general-purpose" microprocessors, one or more special-purpose microprocessors, and/or one or more application specific integrated circuits (ASICs), or some combination thereof. For example, the processor 28 may include one or more reduced instruction set (RISC) or complex instruction set (CISC) processors. Additionally, the processor 28 may process image data to generate control signals for the image sensors, may control and/or monitor operation of the display 36, and/or may detect and determine a position, a geolocation, and/or an orientation for asset(s) 24.

The processor 28 may receive image data via the one or more sensor(s) 32 by scanning the QR code 42, a barcode, and/or any other suitable machine-readable indicia. The QR code 42 may act as an identifier for scenery, topography, equipment, and so forth, associated with the asset(s) 24 within the geographical area 22. For example, the processor 28 may process image data to detect the QR code 42 and identify corresponding image content, asset geolocation code, and the asset data 38 to project onto the display 36. The processor 28 may receive and/or retrieve the corresponding image content from the memory 30 based on the detected QR code 42 and may control operation of the display 36 to display the associated image content. In some embodiments, the processor 28 may receive inputs transmitted from the third-party database 14, the network 18, and the publicly available database 20 and communicate with a QR code generator using the communication component 26 to generate a QR code 42. Accordingly, the asset management system 10 may update and/or generate the cable takeoff measurement 44 associated with the asset(s) 24.

The illustrated embodiment includes a readable or scannable feature such as the QR code 42. The scannable feature may be a quick response (QR) code and/or a Google plus code. In general, Google plus codes are programmable, abbreviated versions of addresses based on latitude and longitude. For example, the Google plus codes includes a combination of letters and numbers that are associated with a latitude and longitude of a particular location. Furthermore, the Google plus codes may be accessed with internet or without an internet connection, which may be advantageous as it can enable tracking of asset(s) 24 in areas which exhibit little to no internet access. In this way, the Google plus codes may be employed to facilitate tracking of asset(s) 24.

The memory 30 of the control system 16 may also be used to store data associated with the asset(s) 24, various other software applications, and the like that are executed by the processor 28. The memory 30 may represent non-transitory computer-readable media (e.g., any suitable form of memory or storage) that may store the processor-executable code used by the processor 28 to perform various techniques described herein.

In some embodiments, the one or more sensor(s) 32 of the control system 16, such as image sensors, are used to acquire image data of the geographical area 22 or the asset(s) 24 within the geographical area 22. Accordingly, image data acquired by image sensors is correlated with the location of the asset(s) 24 and/or the geographical area 22. As such, one or more cameras/devices including image sensors may be communicatively coupled with or resident on an unmanned aerial vehicle (UAV) 33. Flight operations of the UAV 33 may be controlled by the control system 16 according to programmed instructions to cause the UAV 33 to capture image or other data of the geographical area 22. In other embodiments, the sensor(s) 32 may additionally or alternatively be stationary and distributed throughout the geographical area 22. The one or more cameras may include various cameras (e.g., thermal imager, complementary metal-oxide-semiconductor (CMOS) camera, charge-coupled device (CCD)), and may be a part of an electronic device (e.g., cell phones, portable devices, head-mounted display device). The sensor(s) 24 may also include photodiodes, photodetectors and/or other suitable detectors used to collect sensor data. In some embodiments, image sensors may be used to generate data associated with the location of the asset(s) 24. For example, the image sensor may detect the asset(s) 24 and generate position data and/or orientation data based on the detection. The control system 16 may determine a point-of-view or perspective of the camera based on the position data and/or orientation data and may instruct the display 36 to depict a point-of-view. For example, the control system 16 may determine the perspective of the camera based on the location of the asset(s) 24. Furthermore, the one or more sensor(s) 32 may also include location sensors, which may be used to determine a geolocation of the asset(s) 24 or the geographic area 22, thereby generating a geolocation code associated with the asset(s) 24 (e.g., asset geolocation code). The geolocation code and image data associated with the asset(s) 24 may be utilized to produce a model 40. Relatedly, the one or more sensor(s) 32 may also be utilized to generate the QR code 42 based off the asset geolocation code. For example, the processor 28 may receive data from the one or more sensor(s) 32, such as image data and location data, and generate the QR code 42 based on the received data. In some embodiments, sensor data may be received by the processor 28 to generate the cable takeoff measurement 44. For example, the cable takeoff measurement 44 may be determined by determining a distance between one or more asset(s) 24 by utilizing their respective geolocation codes that were generated using image sensors and location sensors. In this way, the one or more sensor(s) 32 facilitate tracking of the asset(s) 24 during construction of a new facility.

The location of the asset(s) 24 may be determined using any suitable technique(s), to any appropriate degree of specificity. For example, the control system 16 may include location sensor(s), transceiver(s), and/or other software or hardware component(s) that are configured to determine the location using one or more of the following: an inertial navigation system, a dead-reckoning navigation system, a network positioning system, a radio position finding system, a satellite-based navigation system, an accelerometer system, a gyroscope system, and so forth. The satellite-based navigation system may include one or more of a Global Positioning System (GPS) receiver, a Globalnaya Navigatsionnaya Sputnikovaya Sistema (GLONASS) receiver, a Galileo receiver, an Indian Regional Navigational Satellite (IRNS) System receiver, and so forth. The location may also be determined through geolocation based on an internet protocol (IP) address of an electronic device.

The I/O ports 34 may be interfaces that may couple to other peripheral components, such as input devices (e.g., keyboard, mouse, head-mounted display device), sensors, input/output (I/O) modules, and the like.

In certain embodiments, the display 36 may be provided in the form of a computing device, such as a head-mounted display device (e.g., headset), a personal computer, a laptop, a tablet, a mobile device (e.g., a smart phone), or any other suitable computing device. The control system 16 may control operation of the display 36 to display generated image content associated with the asset data 38. Additionally or alternatively, the display 36 may be a head-mounted display device that may be worn on the head of a user and the display 36 may be disposed in front of either one or both eyes of the user. The display 36 may display computer-generated imagery, live imagery, virtual reality (VR) imagery, augmented reality (AR) imagery, mixed reality imagery, and so on. In some embodiments, the display 36 may be viewed by any number of users. As such, multiple users may view the display 36 and may collaborate during design of an asset(s) 24 or experience using the asset management system 10.

The display 36 may operate to depict visualizations associated with the asset management system 10, software, or executable code being processed by the processor 28. The display 36 may be any suitable type of display, such as a liquid crystal display (LCD), plasma display, or an organic light emitting diode (OLED) display, for example. In one embodiment, the display 36 may depict visualizations such as the QR code 42, the model 40 (e.g., 3D model, simulated model, updated model), the cable takeoff measurement 44, the asset data 38, or AR/VR visualizations associated with the asset(s) 24. In certain embodiments, the display 36 may include machine-readable indicia (e.g., a bar code, the QR code 42, and the like) and/or may include trackers (e.g., trackable markers) that are positioned on the surface of the display 36 associated with the asset(s) 24. In certain embodiments, the display 36 may depict image content associated with the location of the asset(s) 24. For example, the display 36 may generate image data associated with the location of the geographical area 22 and/or the asset(s) 24 acquired by the UAV 33. Additionally or alternatively, the control system 16 may instruct the display 36 to display a notification associated with the asset(s) 24. For example, the notification may include information indicating that the asset data 38 may have been assigned, modified, deleted, or dissociated. Once a geolocation code has been assigned for the asset(s) 24, the control system 16 may push a notification to display the geolocation code and/or the QR code 42, which includes image data of the asset(s) 24 and the geolocation code. In another example, the notification may include updated information about an updated cable takeoff measurement 44, an updated QR code 42, updated model 40, updated image data, an updated geolocation code, or updated location data.

Additionally, the display 36 may be provided in conjunction with a touch-sensitive mechanism (e.g., a touch screen) that may function as part of a control interface for the asset management system 10. As such, the display 36 may be a touch display capable of receiving inputs from the asset management system 10. In other embodiments, the display 36 may be capable of depicting images as part of a manipulatable 3D AR, VR projection, or visualization of the model 40, as will be discussed in greater detail in FIGS. 3-5 below.

In an embodiment, the asset management system 10 may manage data associated with the asset(s) 24. For example, the control system 16 may determine that one or more locations associated with one or more geolocation codes is incorrect based on image data. As such, the asset management system 10 may eliminate asset(s) 24 or geolocation codes from the model 40. In some embodiments, the control system 16 may assign, delete, or dissociate geolocation codes, QR codes 42, or image data associated with one or more asset(s) 24 within a model 40. In this way, the model 40 is dynamically updated based on input of image data and/or location data of one or more asset(s) 24.

In one example, the model 40 includes information regarding how much remaining capacity there is in each conduit. In response to a query, a recommended route can be provided to run electric or data lines to a new position in the park. For example, the model 40 may be able to map out which conduits would provide the best or closest path to that new position. The query may include a proposed location for a new attraction with a particular associated takeoff requirement. The model 40 may respond to the query by generating an overlaid electrical or other conduit route that taps into existing conduits and terminates at the new location. The existing conduits are accessed based on estimated remaining capacity.

Figure 2:
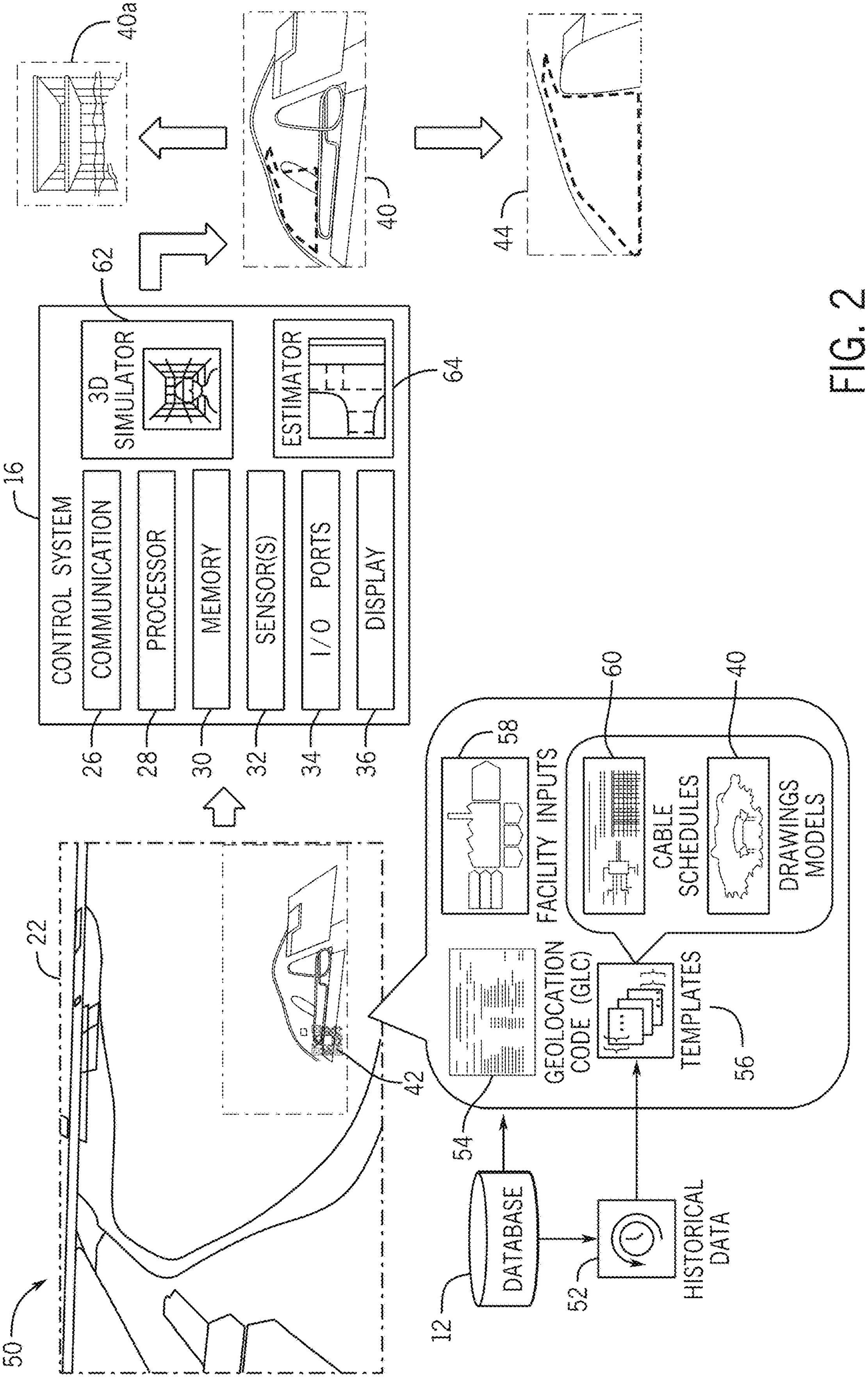
FIG. 2 is an example workflow using the asset management system, in accordance with an embodiment of the present disclosure.

By way of example, FIG. 2 is an example workflow 50 using the asset management system 10 of FIG. 1, in accordance with an embodiment of the present disclosure. The asset management system 10 utilizes data stored in the database 12 to generate the asset data 38, such as the QR code 42 or the model 40 of the asset(s) 24. Accordingly, FIG. 2 demonstrates that the QR code 42 and the model 40 generated by the asset management system 10 may be utilized to further generate a simulated model 40*a* or the cable takeoff measurement 44 associated with the asset(s) 24 and/or plan construction and placement of asset(s) 24.

The control system 16 may be configured to access historical data 52 from the database 12. Historical data 52 may include data related to prior construction projects, old assets, etc. In this way, the asset management system 10 may utilize the historical data 52 to generate templates 56 that may be subsequently utilized for organizing, consolidating, and standardizing all input data (e.g., facility inputs 58) and data formats received that are associated with the asset(s) 24. For example, the templates 56 may be generated and used for inputting facility inputs 58 associated with cable schedules 60 to generate cable takeoff measurement 44. Additionally or alternatively, the templates 56 may be generated and used for inputting data associated with generating drawings/models of the asset(s) 24 in the geographical area 22. In this way, the templates 56 increase efficiency by standardizing data formatting, eliminating redundancy, and centralizing data.

In some embodiments, the geolocation codes 54 may be used by the asset management system 10. Geolocation codes 54 (e.g., asset geolocation codes) designate the geographical location of the asset(s) 24 within the geographical area 22. For example, the control system 16 may determine that the locations associated with the geolocation codes 54 are correct by using image data. Accordingly, the geolocation code 54 and image data associated with the asset(s) 24 may be utilized to generate the model 40. Additionally or alternatively, the QR code 42 may be generated that is associated with the geolocation code 54 and image data of the asset(s) 24 within the model 40. In some embodiments, the control system 16 may determine that one or more locations associated with the geolocation code 54 is incorrect. In one example, the control system 16 may receive updated information location of the asset(s) 24 that does not correlate with a preexisting geolocation code 54. As such, the control system 16 may eliminate asset(s) 24 that are assigned incorrect geolocation code 54.

The control system 16 may also include a 3D simulator 62 and an estimator 64. Accordingly, the control system 16 may utilize the model 40 and the 3D simulator 62 to generate the simulated model 40*a*. For example, the simulated model 40*a* may include simulations (e.g., 3D models) of new facilities that may be overlaid in a geographical area 22. As such, this may assist in the construction of new facilities in an amusement park. In other embodiments, the model 40 may be utilized by the control system 16 to generate the cable takeoff measurement 44. The estimator 64 may utilize the model 40 (e.g., model of geographical area 22 and/or simulated model 40*a*) to determine location(s)/geographic distance(s) associated with the asset(s) 24 (e.g., one or more ends/endpoints of a cable). For example, the control system 16 may receive confirmation that one or more location of one or more end points of the cable is within the geographical area 22. In response to receiving the confirmation, the estimator 64 may generate a cable takeoff measurement 44 based on the location and/or geographic distance between one or more end points of the cable coupled to the one or more asset(s) 24. Accordingly, the control system 16 may send the cable takeoff measurement 44 to one or more third parties for review. Additionally or alternatively, the control system 16 may receive confirmation that one or more endpoints of a cable are within the geographical area 22 after determining the cable takeoff measurement 44. In this way, the control system 16 may verify that a correct measurement has been acquired. In further embodiments, the estimator 64 may be modified to determine geographic distances between other asset(s) 24 (e.g., one or more rides in an amusement park). It should be noted that the estimator 64 may be used to determine measurements (e.g., lengths, widths, areas) of various types of asset(s) 24, including, but not limited to, structures, utilities, cables, wires, piping, sidewalks, paths, overhead wires, sewers, landscape assets (e.g., plantings, lights, sprinklers), etc.

In one example, the asset management system 10 may be utilized to determine locations and lengths of gas pipes within a geographical area 22. Third parties such as gas companies may perform underground scans to obtain information about existing gas pipes or construction of new gas pipes. As such, the asset management system 10 allows gas companies to cross-reference their excavation proposals about existing gas pipes or construction of new gas pipes. For example, the gas companies may cross-reference information in the model 40 relating to gas pipes in the database 12, which may include data associated with gas pipes within a geographical area 22 from alternative third parties or historical data 52. Accordingly, the control system 16 may determine that one or more gas pipes are within a geographical area 22 after a gas company cross-references their excavation proposal with the database 12. Additionally or alternatively, the control system 16 may utilize the 3D simulator 62 to generate a simulated model 40*a* of the locations of gas pipes. In this way, the asset management system 10 may prevent accidental gas pipe ruptures within the geographical area 22.

Furthermore, the asset management system 10 may be used to determine measurements associated with additional asset(s) 24, such as utility lines, sidewalks, sewers, or trees to accommodate construction and placement of new asset(s) 24. Data stored on the database 12 and/or the historical data may include location data and/or capacity data (e.g., electrical capacity, volume/flow within pipes) associated with existing assets such as utility lines, conduits (e.g., electrical cables, wires), sewers, sidewalks in proximity to the geographical area 22. For example, the existing data may include information associated with locations, lengths, and areas of existing sidewalks. Based on the locations, the lengths, and the areas of the existing sidewalks, the asset management system 10 may determine a current guest capacity that the existing sidewalks can accommodate using facility inputs 58 and models 40 associated with the existing assets. For example, construction of a new attraction in proximity to the existing sidewalks may prompt an increase in the number of guests that the existing sidewalks may need to accommodate. Accordingly, the control system 16 may utilize the estimator 64 to estimate a length of sidewalk and the 3D simulator 62 to simulate locations and/or lengths of the new asset(s) 24 and generate models 40 (e.g., new sidewalk construction) to accommodate the increase in guests.

Figure 3:
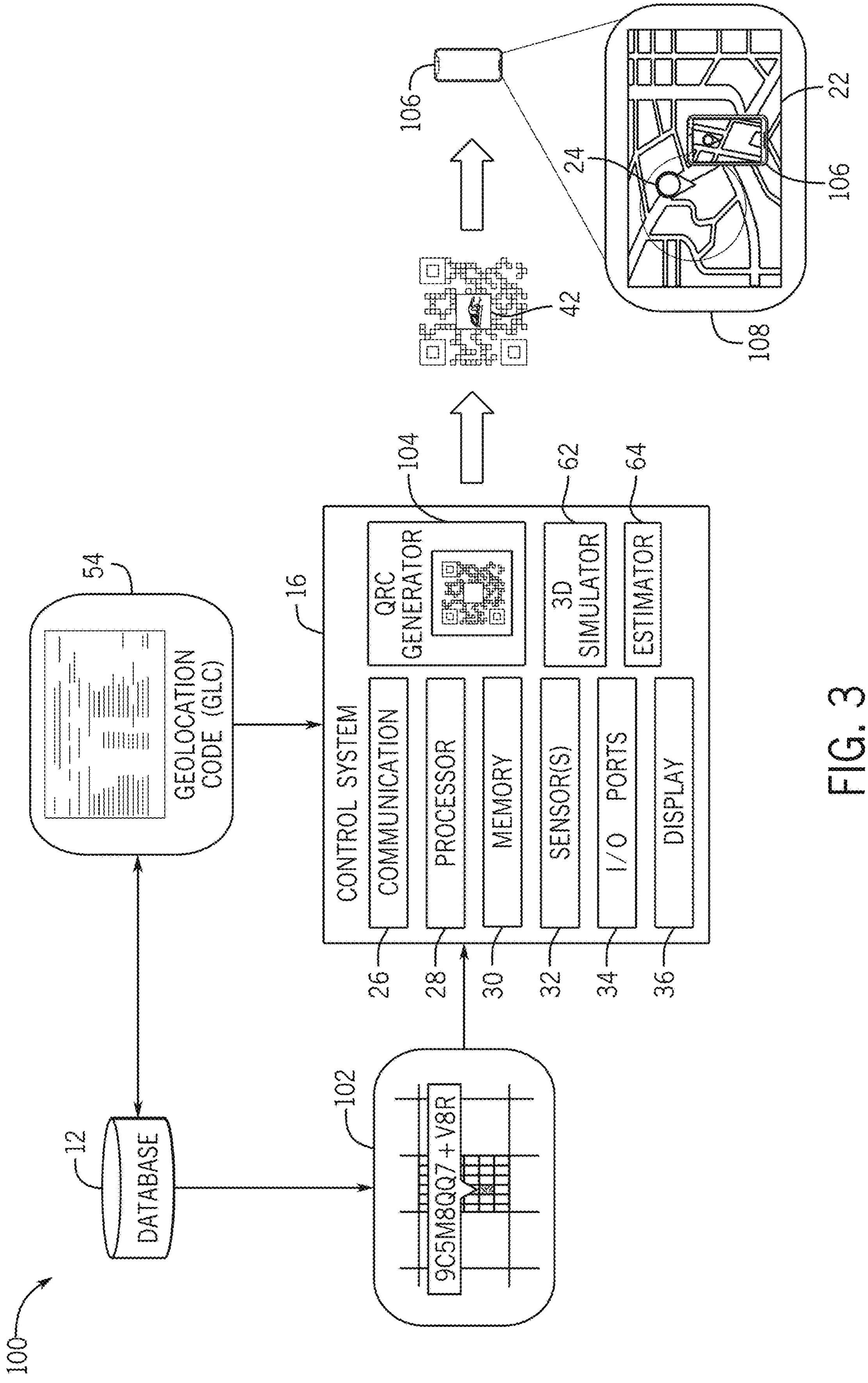
FIG. 3 is an example workflow including scannable geolocation codes using the asset management system, in accordance with an embodiment of the present disclosure.

With the foregoing in mind, FIG. 3 is an example workflow 100 including scannable geolocation codes using the asset management system 10 of FIG. 1, in accordance with an embodiment of the present disclosure. The asset management system 10 utilizes data stored in the database 12 to generate a scannable QR code 42 using the geolocation code 54 (e.g., the QR code 42). Accordingly, FIG. 3 demonstrates that the QR code 42 may be utilized to keep track of the location of the asset(s) 24 within the geographical area 22.

The control system 16 may access the database 12 to retrieve location data associated with the asset(s) 24 and/or end points of a cable, thereby generating the geolocation code 54. For example, image data and/or location data acquired by the one or more sensor(s) 32 may be utilized in determining the location and assigning the geolocation code 54 for the asset(s) 24 and/or end points of a cable or gas pipes. In some embodiments, the control system 16 may utilize additional location information 102, which may be received from software or hardware components that utilize satellite-based navigation system, radio position finding system, etc. The control system 16 may further include a QRC generator 104. The control system 16 may utilize the QRC generator 104 to generate the QR code 42.

In general, the present embodiments allow the QR code 42 to be utilized as a means of tracking the asset(s) 24. The QR code 42 is embedded with and/or associated with the geolocation code 54 and image data of the asset(s) 24. For example, a user device 106 may scan the QR code 42. Accordingly, a display 108 of the user device 106 may present depictions of the location of asset(s) 24 within the geographical area 22 or be able to access the asset data 38 (FIG. 1). In this way, the QR code 42 enables tracking of the asset(s) 24 location or accessing of the asset data 38. It should be appreciated that the QR code 42 may be encrypted, which provides added security to the QR code 42. For example, the user device 106 may be able to access the asset data 38 only when the location of the user device is within proximity (e.g., 1.0 kilometer) of the asset(s) 24. As such, the added security features to the QR code 42 limit and/or prevent unauthorized users from accessing asset data 38.

Figure 4:
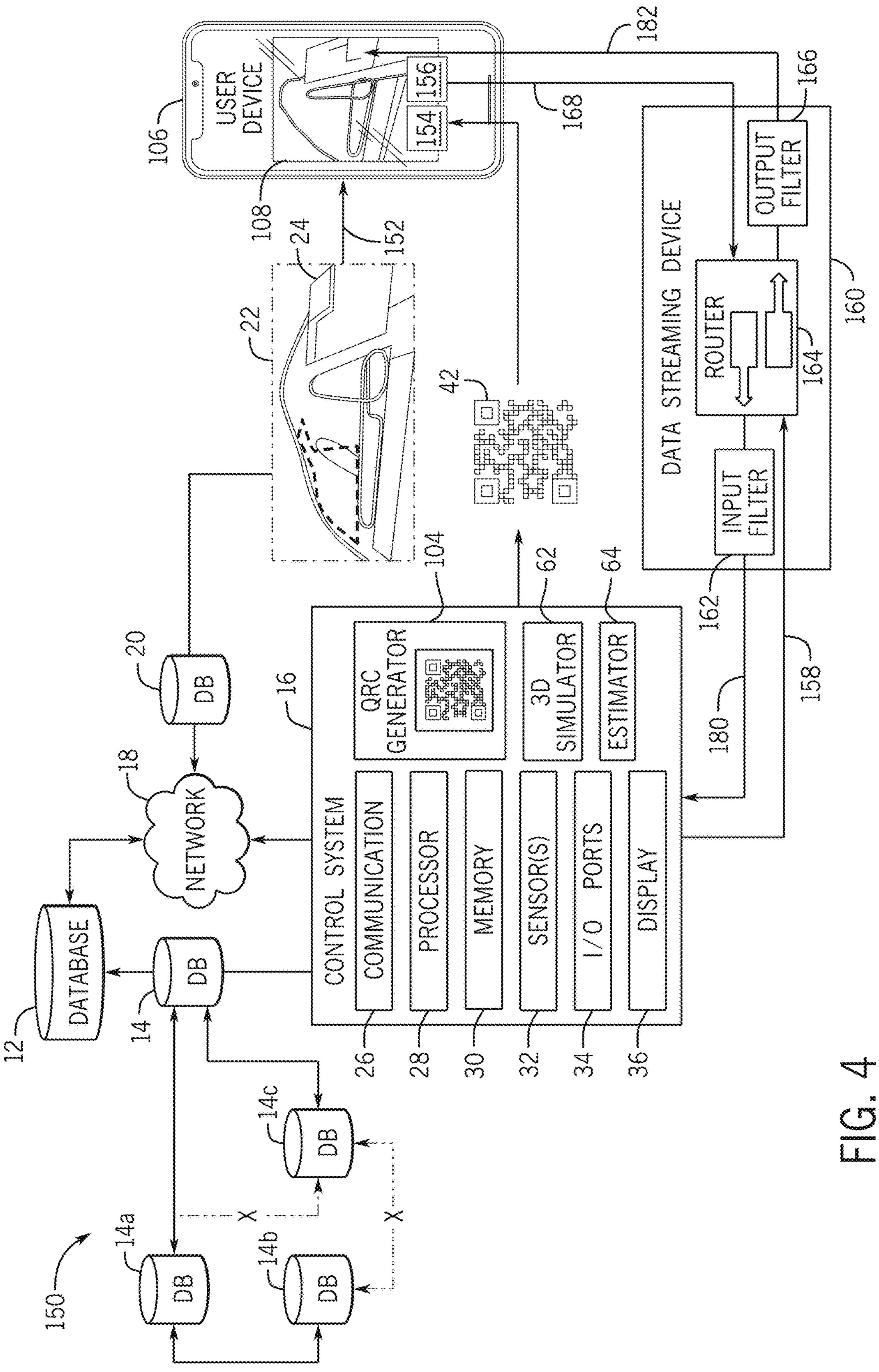
FIG. 4 is an example interaction of a user device with the asset management system, in accordance with an embodiment of the present disclosure.

By way of example, FIG. 4 is an example interaction 150 of a user device with the asset management system 10 of FIG. 1, in accordance with an embodiment of the present disclosure. The asset management system 10 may utilize the user device 106 to access the asset data 38. Accordingly, FIG. 3 demonstrates that the user device 106 may be utilized to access and update the asset data 38 in real-time.

The asset management system 10 may be communicatively coupled to the user device 106. Accordingly, the control system 16 may communicate with the user device 106. For example, the asset management system 10 on the user device 106 may include an integrated QR application (app) 74 that allows the user device 106 to scan QR codes 42. As such, the user device 106 may access the asset management system 10 by scanning the QR code 42 that is associated with the asset(s) 24 (FIG. 1). Furthermore, the asset management system 10 on the user device 106 may have a real-time data acquisition application 156 that acquires data (e.g., image data, location data) associated with the asset(s) 24 in the geographical area 22 in real-time, thereby enabling updates to data associated with the asset(s) 24 in the geographical area 22.

In some embodiments, the user device 106 may receive initial data 152, which includes data associated with the asset(s) 24 and the geographical area 22. This initial data 152 may be modified upon acquisition of new data in real-time, which can be seen in FIG. 4. For example, user device 106 may acquire new data 168 through the one or more sensor(s) 32 within the user device 106. In other embodiments, a device such as UAV 33 may be communicatively coupled with the user device and may acquire new data 168. In one example, the new data 168 may include location information of the asset(s) 24 acquired using location sensors within a device and/or image data of the asset(s) 24 acquired using image sensors within a device. The new data 168 may be received by a data streaming device 160, which is communicatively coupled to the asset management system 10. The data streaming device 160 may include an input filter 162, a router 164, and an output filter 166. Accordingly, the data streaming device 160 is able to filter data based on data that is not requested by or pertinent to the asset management system 10. By way of example, the router 164 may receive new data 168 and subsequently transmit the new data 168 to the input filter 162. The input filter 162 may filter out/remove information that is not requested by the asset management system 10. Accordingly, the filtered data 180 is communicated to the control system 16. The processor 28 may utilize the filtered data 180 and update the model 40 (see FIG. 4) based on the filtered data 180, thereby generating an updated model 158 (e.g., model 40).

The control system 16 may communicate the updated model 158 to the router 164, wherein the router 164 may transmit the updated model 158 to the output filter 166. The output filter 166 may remove data that is not requested by the user device 106 and generate an updated model 182. Accordingly, the updated model 182 is communicated to the user device 106, wherein the user device display 108 provides a visualization of the updated model 182. It should be noted that additional devices (e.g., headset, UAV 33, portable devices) may be coupled with the asset management system 10 that may update the asset data 38 in real-time, which can be accessed on the user device 106. In this way, the user device 106 is able to facilitate acquisition and visualization of the asset data 38.

Figure 5:
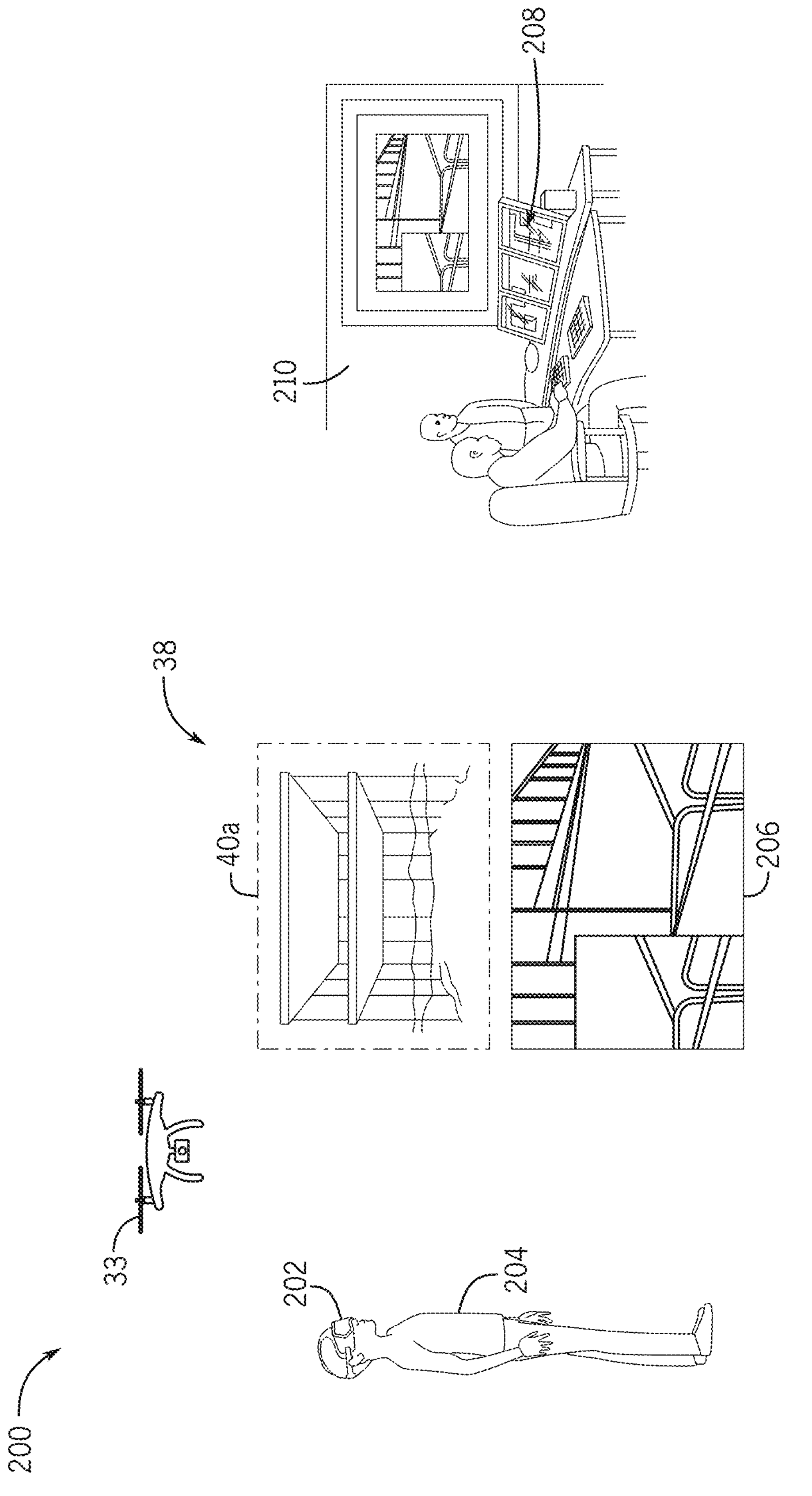
FIG. 5 is a schematic diagram of a dynamic interface of the asset management system, in accordance with an embodiment of the present disclosure.

With the preceding in mind, FIG. 5 is schematic diagram 200 of a dynamic interface, in accordance with an embodiment of the present disclosure. Accordingly, FIG. 5 demonstrates that the asset management system 10 may utilize a headset 202 and a UAV 33 to visualize the asset data 38. The headset 202 and UAV 33 may be communicatively coupled with the control system 16 of the asset management system 10 of FIGS. 1-4. For example, flight operations and image acquisition of the UAV 33 may be controlled using programmed instructions by the control system 16. In this way, a user 204 wearing the headset 202 may be able to visually see the models 40 (e.g., simulated models **40*a* overlaid with the real-time 3D images 206 that are acquired by the UAV 33. For example, the user 204 may view the model 40 (FIG. 1) of the asset(s) 24 (FIG. 1) that is located in the geographic area 22 (FIG. 1) on the headset 202. Additionally or alternatively, the user 204 may view updated model 40 and/or updated asset data 38 on the headset 202. Furthermore, additional devices 208 (e.g., computing systems) may be communicatively coupled to the asset management system 10. In this way, other users may be able to view real-time 3D images 206 via one or more displays 210 coupled to the additional devices 208**.

While only certain features of the disclosure have been illustrated and described herein, many modifications and changes will occur to those skilled in the art. It is, therefore, to be understood that the appended claims are intended to cover all such modifications and changes.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An asset management system, comprising:

a sensor configured to detect asset tags to acquire asset geolocation codes of a plurality of assets positioned in a geographic area;

a controller communicatively coupled to an image sensor, wherein the controller is configured to:

receive the asset geolocation codes of the plurality of assets;

receive image data;

generate a model of the geographic area using locations associated with the asset geolocation codes and the image data to place the plurality of assets in the model;

receive confirmation of one or more locations associated with one or more end points of a cable in the geographic area;

determine a geographic distance between a first asset and a second asset of the plurality of assets using the model;

assign geolocation codes for the cable assigned to couple the first asset and the second asset, wherein the geolocation codes are associated with the one or more end points of the cable;

receive location data comprising a location of a user device;

receive a first location of the first asset and a second location of the second asset in the geographic area; and in response to determining that the user device is within a threshold distance of the first location and the second location, generating image data of the geographic area on a display of the user device, wherein the image data comprises:

the first asset in the first location and the second asset in the second location coupled to the one or more end points of the cable; and the geolocation codes of the cable.

2. The asset management system of claim 1, wherein the controller is configured to determine that the locations associated with the asset geolocation codes are correct using the image data.

3. The asset management system of claim 1, wherein the controller is configured to:

determine that one or more locations associated with corresponding one or more asset geolocation codes are incorrect based on the image data; and eliminate assets associated with the one or more asset geolocation codes from the model.

4. The asset management system of claim 3, wherein the controller is configured to:

generate a notification for the assets associated with the one or more asset geolocation codes from the model.

5. The asset management system of claim 1, wherein the controller is configured to:

assign, delete, or dissociate geolocation codes for the plurality of assets.

6. The asset management system of claim 1, wherein the controller is configured to:

assign a first geolocation code for the first asset associated with one end point of the one or more end points of the cable; and assign a second geolocation code for the second asset associated with another end point of the one or more end points of the cable.

7. The asset management system of claim 1, wherein the controller is configured to:

send a cable takeoff to a third party.

8. An asset management method, comprising:

receiving, via processing circuitry, location data associated with a plurality of assets of a geographic area, wherein the location data is received from a plurality of sources;

determining, via the processing circuitry, that an individual asset of the plurality of assets is associated with a plurality of locations based on the location data;

generating, via the processing circuitry, a model of the geographic area using the location data to place the plurality of assets in the model, wherein the individual asset is placed in the model at the plurality of locations;

receiving, via the processing circuitry, confirmation of one or more locations associated with one or more end points of a cable in the geographic area;

determining, via the processing circuitry, a plurality of geographic distances between the individual asset and a second asset of the plurality of assets using the plurality of locations of the model;

assigning, via the processing circuitry, geolocation codes for the cable assigned to couple the individual asset and the second asset, wherein the geolocation codes are associated with the one or more end points of the cable;

receiving, via the processing circuitry, location data comprising a location of a user device;

receiving, via the processing circuitry, a first location of the individual asset and a second location of the second asset in the geographic area; and in response to determining that the user device is within a threshold distance of the first location and the second location, generating, via the processing circuitry, image data of the geographic area on a display of the user device, wherein the image data comprises:

the individual asset in the first location and the second asset in the second location coupled to the one or more end points of the cable; and the geolocation codes of the cable.

9. The method of claim 8, comprising displaying, via the processing circuitry, the model on the display.

10. The method of claim 8, comprising causing the model to be displayed on a head-mounted display located in the geographic area.

11. The method of claim 10, comprising:

receiving, via an image sensor of the head-mounted display, the image data of the geographic area; and updating, via the processing circuitry, the model based on the image data such that the individual asset is located at an updated location of the plurality of locations.

12. The method of claim 11, comprising determining, via the processing circuitry, based on the updated model, a distance between the individual asset and the second asset and an associated cable takeoff.

13. The method of claim 12, comprising detecting, via the processing circuitry, an asset tag of an individual cable of the associated cable takeoff.

14. The method of claim 13, comprising determining, via the processing circuitry, that the detected asset tag has a geolocation code that aligns with the location of the updated location and a location of the second asset.

15. A non-transitory computer-readable medium comprising computer-executable instructions that, when executed by at least one processor, are configured to cause the at least one processor to perform operations comprising:

detecting one or more asset tags based on sensor data to acquire geolocation codes of a plurality of assets positioned in a geographic area;

instructing one or more cameras to acquire image data of the geographic area;

receiving asset geolocation codes of the plurality of assets;

receiving the image data;

generating a model of the geographic area using locations associated with the asset geolocation codes and the image data to place the plurality of assets in the model;

receiving confirmation of one or more locations associated with one or more end points of a cable in the geographic area;

determining a geographic distance between a first asset and a second asset of the plurality of assets using the model;

assigning geolocation codes for the cable assigned to couple the first asset and the second asset, wherein the geolocation codes are associated with the one or more end points of the cable;

receiving location data comprising a location of a user device;

receiving a first location of the first asset and a second location of the second asset in the geographic area; and in response to determining that the user device is within a threshold distance of the first location and the second location, generating image data of the geographic area on a display of the user device, wherein the image data comprises:

the first asset in the first location and the second asset in the second location coupled to the one or more end points of the cable; and the geolocation codes of the cable.

16. The non-transitory computer-readable medium of claim 15, wherein the instructions, when executed by the at least one processor, are configured to cause the at least one processor to perform operations comprising:

displaying the image data of the geographic area on a head-mounted display.

17. The non-transitory computer-readable medium of claim 16, wherein the instructions, when executed by the at least one processor, are configured to cause the at least one processor to perform operations comprising:

updating the image data displayed on the user device based on image data received by a head-mounted device.

18. An asset management system, comprising:

a controller, wherein the controller is configured to:

receive asset geolocation codes of a first plurality of assets positioned in a first geographic area;

generate a first model of the first geographic area using locations associated with the asset geolocation codes to place the first plurality of assets in the first model, wherein the first model comprises one or more conduits associated with each asset of the first plurality of assets;

determine a remaining capacity for the one or more conduits based on capacity data associated with each asset of the first plurality of assets, wherein a subset of conduits of the one or more conduits is associated with the remaining capacity;

receive a query comprising a proposed location of a second plurality of assets in a second geographic area;

determine a recommended route to provide conduit access to a second plurality of assets via the subset of conduits from a first location in the first geographic area to the proposed location in the second geographic area;

generate a second model, wherein the second model comprises the first geographic area and the second geographic area, and wherein the second model comprises the recommended route;

receive location data comprising a location of a user device accessing the asset management system;

receive a first location of a first asset of the first plurality of assets in the first geographic area and a second location of a second asset of a second plurality of assets in the second geographic area; and in response to determining that the user device is within a threshold distance of the first location and the second location, generating image data of the first geographic area and the second geographic area on a display of the user device using the second model, wherein the image data comprises the recommended route overlaid on the image data.

19. The asset management system of claim 18, wherein the controller is configured to:

assign geolocation codes for the second plurality of assets in the second geographic area.

20. The asset management system of claim 19, wherein the controller is configured to:

assign a first geolocation code for the first asset associated with one end point of one or more end points of a cable; and assign a second geolocation code for the second asset associated with another end point of the one or more end points of the cable.

21. The asset management system of claim 18, wherein the controller is configured to:

receive excavation proposals associated with the first geographic area, the second geographic area, or a combination thereof.

22. The asset management system of claim 18, wherein the image data on the display comprises the recommended route overlaid on the first geographic area and the second geographic area and terminating in the proposed location.

23. The asset management system of claim 22, wherein the controller is configured to:

determine one end of a first conduit of the subset of conduits is associated with the first geographic area and a second end of the first conduit of the subset of conduits is associated with the second geographic area.

24. The asset management system of claim 18, wherein the second model comprises locations, lengths, or combinations thereof associated with the second plurality of assets in the second geographic area.

25. An asset management method, comprising:

detecting, via a processor, one or more asset tags based on sensor data to acquire geolocation codes of a first plurality of assets positioned in a first geographic area;

receiving, via the processor, asset geolocation codes of the first plurality of assets;

generating, via the processor, a first model of the first geographic area using locations associated with the asset geolocation codes to place the first plurality of assets in the first model, wherein the first model comprises one or more conduits associated with each asset of the first plurality of assets;

determining, via the processor, a remaining capacity for the one or more conduits based on capacity data associated with each asset of the first plurality of assets, wherein a subset of conduits of the one or more conduits is associated with the remaining capacity;

receiving, via the processor, a query to determine whether the subset of conduits is capable of providing conduit access to a second plurality of assets of a second geographic area, wherein the query comprises a location of the second geographic area;

generating, via the processor, a second model, wherein the second model comprises the first geographic area and the second geographic area, and a recommended route for providing the conduit access between the first geographic area and the second geographic area;

receiving, via the processor, location data comprising a location of a user device;

receiving, via the processor, a first location of a first asset of the first plurality of assets in the first geographic area and a second location of a second asset of a second plurality of assets in the second geographic area; and in response to determining that the user device is within a threshold distance of the first location and the second location, generating, via the processor, image data of the first geographic area and the second geographic area on a display of the user device using the second model, wherein the image data comprises the recommended route overlaid on the image data.

26. The method of claim 25, wherein the capacity data comprises electrical capacity, volume of a pipe, flow within pipes, area of sidewalks, or a combination thereof.

27. The method of claim 25, wherein the one or more conduits comprise electrical lines, data lines, gas pipes, sidewalks, sewer lines, or a combination thereof.

28. The method of claim 25 comprising, determining, via the processor, one or more locations associated with one or more gas pipes in the first geographic area.

29. The method of claim 25 comprising, receiving, via the processor, image data acquired from an unmanned aerial vehicle (UAV).

30. A non-transitory computer-readable medium comprising computer-executable instructions that, when executed by at least one processor, are configured to cause the at least one processor to perform operations comprising:

receiving asset geolocation codes of a first plurality of assets;

generating a first model of a first geographic area using locations associated with the asset geolocation codes to place the first plurality of assets in the first model, wherein the first model comprises one or more conduits associated with each asset of the first plurality of assets;

determining a remaining capacity for the one or more conduits based on capacity data associated with each asset of the first plurality of assets, wherein a subset of conduits of the one or more conduits is associated with the remaining capacity;

receiving a query to determine whether the subset of conduits is capable of providing conduit access to a second plurality of assets of a second geographic area, wherein the query comprises a location of the second geographic area;

generating a second model, wherein the second model comprises the first geographic area and the second geographic area, and wherein the second model comprises a recommended route for providing the conduit access between the first geographic area and the second geographic area;

receiving location data comprising a location of a user device;

receiving a first location of a first asset of the first plurality of assets in the first geographic area and a second location of a second asset of a second plurality of assets in the second geographic area; and in response to determining that the user device is within a threshold distance of the first location and the second location, generating image data of the first geographic area and the second geographic area on a display of the user device using the second model, wherein the image data comprises the recommended route overlaid on the image data.

31. The non-transitory computer-readable medium of claim 30, wherein the computer-executable instructions, when executed by the at least one processor, are configured to cause the at least one processor to perform operations comprising:

displaying the image data of the first geographic area on a head-mounted device.

32. The non-transitory computer-readable medium of claim 30, wherein the computer-executable instructions, when executed by the at least one processor, are configured to cause the at least one processor to perform operations comprising:

receiving confirmation of one or more locations associated with end points of a conduit in the first geographic area.

* * * * *